United States Patent
Kawakubo et al.

[11] Patent Number: 6,139,989
[45] Date of Patent: *Oct. 31, 2000

[54] CATHODE FORMED OF GRAPHITE/CARBON COMPOSITE FOR LITHIUM ION SECONDARY BATTERY

[75] Inventors: Takamasa Kawakubo, deceased, late of Tano-gun, by Kimiko Kawakubo, legal representative; Masataka Wakihara, Yokohama; Mori Nagayama, Tokyo, all of Japan

[73] Assignee: Mitsubishi Pencil Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,256

[22] Filed: Feb. 21, 1996

[30] Foreign Application Priority Data

Feb. 21, 1995 [JP] Japan .................................. 7-032409

[51] Int. Cl.$^7$ .................................................. H01M 4/38
[52] U.S. Cl. ........................ 429/231.8; 429/217; 429/324
[58] Field of Search ........................... 429/218, 194, 429/209, 217, 231.8, 324; 423/445 R, 448, 414; 264/105, 29.1; 419/33, 44, 64, 67; H01M 4/38, 4/36

[56] References Cited

U.S. PATENT DOCUMENTS

| | | | |
|---|---|---|---|
| 4,157,317 | 6/1979 | Nagasawa et al. | 429/231.8 |
| 5,028,500 | 7/1991 | Fong et al. | 429/218 X |
| 5,273,639 | 12/1993 | Kaneko et al. | 204/294 X |

FOREIGN PATENT DOCUMENTS

| | | |
|---|---|---|
| 57-208079 | 12/1982 | Japan . |
| 62-122066 | 6/1987 | Japan . |
| 63-5348 | 2/1988 | Japan . |
| 1-250854 | 10/1989 | Japan . |
| 2-34902 | 8/1990 | Japan . |
| 3-188367 | 8/1991 | Japan . |
| 5-155610 | 6/1993 | Japan . |

*Primary Examiner*—John S. Maples
*Attorney, Agent, or Firm*—Foley & Lardner

[57] ABSTRACT

A high crystallinity powdery graphite is mixed with an organic binder capable of forming a low crystallinity carbon after firing. A high shearing force is applied to the mixture so that a composition is obtained wherein both the components are dispersed in each other under a mechano-chemical reaction. Then a paste of the composition is extruded so that the high crystallinity graphite is highly oriented. A green extrudate of the composition is fired in an inert atmosphere or a non-oxidation atmosphere at a temperature in a range between 500 and 1,100° C. so that the organic binder contained therein is carbonized and a graphite-carbon carbonaceous composite of an amorphous or random layered structure is obtained, which then is ground and used as a cathode for a lithium ion secondary battery.

16 Claims, 3 Drawing Sheets

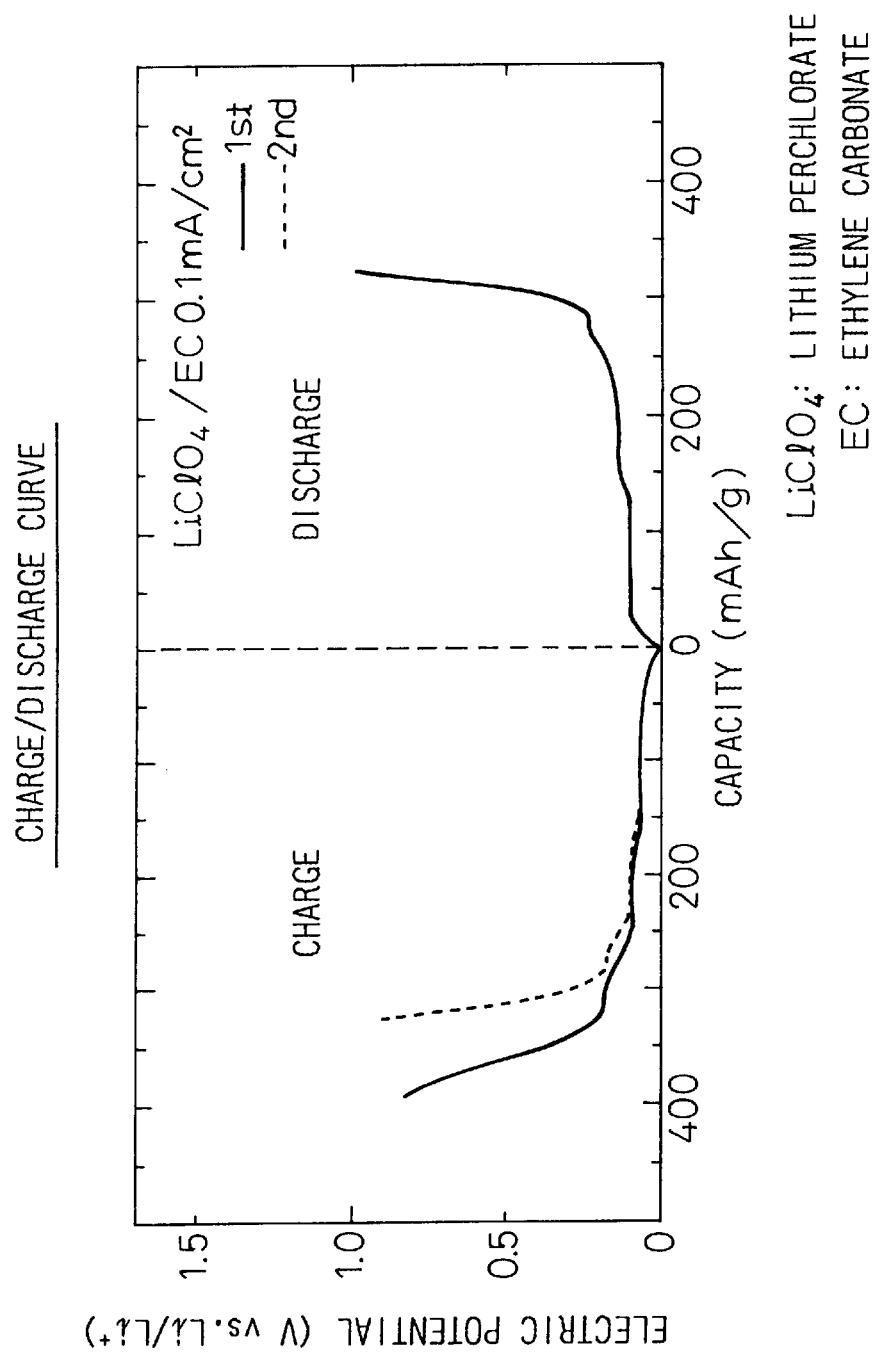

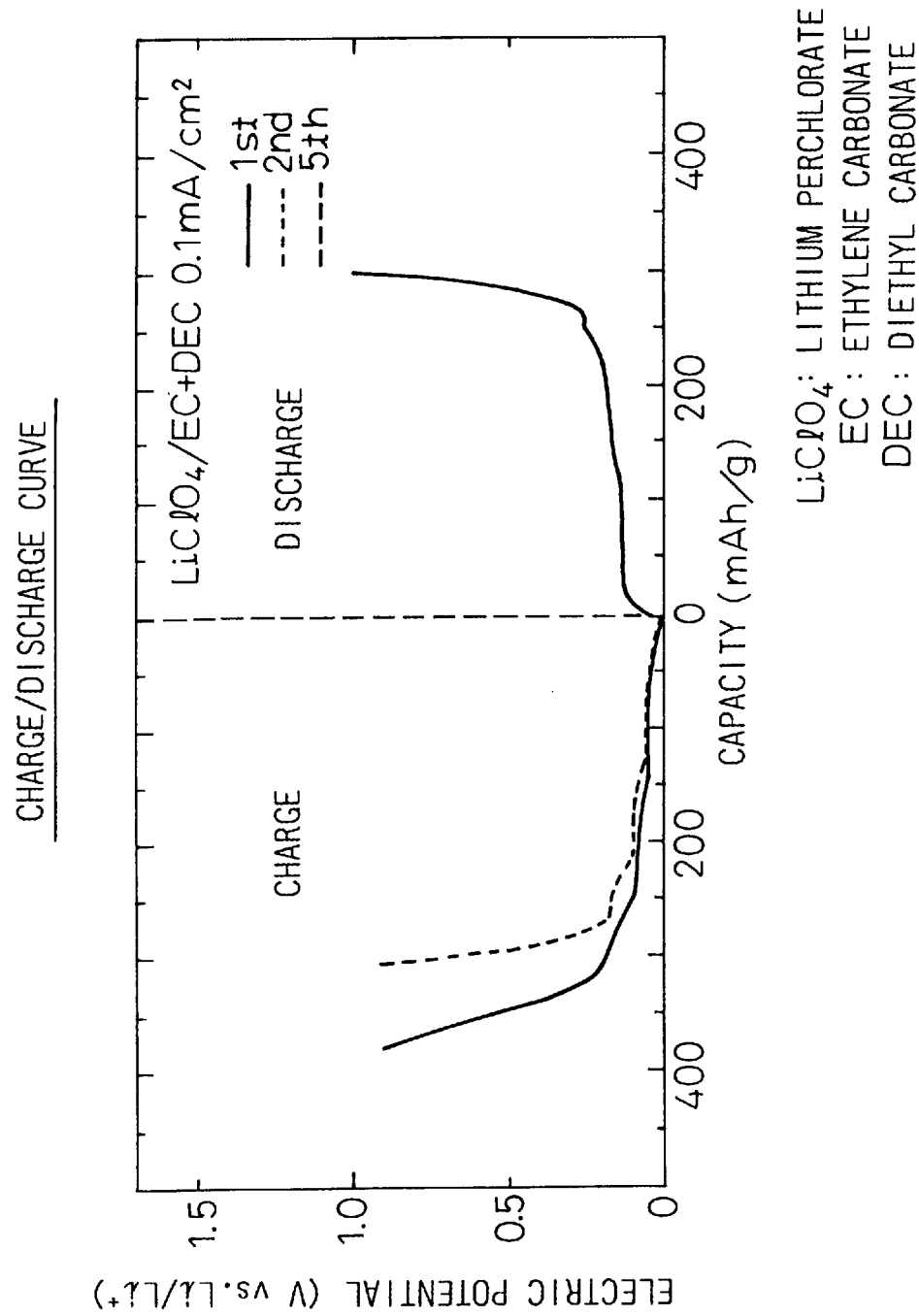

CATHODE FORMED OF GRAPHITE/CARBON COMPOSITE FOR LITHIUM ION SECONDARY BATTERY

BACKGROUND OF THE INVENTION

1. Field of the Invention

The present invention relates to a cathode, for a lithium ion secondary battery, formed of a graphite/carbon composite including powdery crystal graphite orientedly bound with a binder which is a low crystallinity carbonaceous material, and a method for manufacturing such a cathode. Also it relates to a lithium ion battery provided with the cathode.

2. Description of the Related Art

All batteries wherein metallic lithium is used as a material for activating a cathode are called lithium batteries. Correctly, a material for activating an anode is combined therewith to form a "manganese dioxide-lithium battery".

The lithium battery which has been recently put into practice, generates a high voltage about twice that of the conventional dry cell, has a large capacity and has a long shelf life of five years or more, whereby it has become widely used even though it is expensive. As a result of the recent development of the miniaturization technology for electronic apparatuses, there is an increased need for the miniaturization of batteries used for a power source thereof, which stimulates the research and development for novel lithium ion secondary batteries having a higher energy density, a larger capacity and a higher electro-motive force.

There are problems to be solved, however, in the conventional lithium batteries since metallic lithium in, for example, a foil form is used as a material for activating the cathode. That is, metallic lithium is eluted in an electrolytic solution in accordance with the discharge and is deposited again during the charge. At that time, lithium is deposited to form dendrites or particulates. Dendrites may cause a short-circuit accident or a reduction in capacity when it falls off, which results in the deterioration of the cycling characteristic and a reduction in safety. Since dendrites are liable to be generated when a large current flows, a boosting charge can have an adverse effect on the cycling life of the battery.

To solve such a drawback, it is proposed to use materials capable of occluding lithium such as lithium/aluminum alloy or Wood's metal, for forming a cathode. However, these materials have a poor processibility as electrode materials.

Of the materials capable of occluding lithium, carbon is practically the most suitable for a cathode, and studies have recently been conducted for causing lithium to be carried on various carbonaceous materials such as graphite or the like. Japanese Unexamined Patent Publication (Kokai) No. 57-208079 discloses a anode in which a paste including powdery graphite mixed with a binder is coated on a metal foil collector. This is based on a fact in that, if a battery is charged while using graphite as a cathode, lithium in an anode is electro-chemically intercalated between the graphite layers in the cathode, which lithium can be deintercalated therefrom into an electrolytic solution as ions during the discharge and restored to the anode.

The theoretical value of the discharging capacity of metallic lithium is 3860 mAh/g. However, the theoretical value of the discharging capacity of graphite is 372 mAh/g, even though it could occlude lithium-containing substance even including $LiC_6$, which value is less than ¹⁄₁₀ of that of metallic lithium. Accordingly, a higher capacity cannot always be expected even if the cathode proposed in the prior art, in which lithium is carried by graphite, is used. Also, there is a problem that, when the cathode is formed solely of graphite, the lithium-occlusion capacity becomes low to cause the charge/discharge capacity to be too small to allow use as a lithium ion battery.

If the cathode is formed solely of graphite, it has been found that the decomposition of propylene carbonate (PC) used as an electrolyte proceeds at a Coulomb efficiency of 100%, resulting in the problem of lithium-occlusion.

Also, in the cathode formed solely of graphite, graphite crystals repeatedly expand and contract in the direction of the C axis during the intercalation/deintercalation of lithium relative to the graphite layers due to the charge and discharge. If the charging/discharging cycle is repeated many times, the crystal structure of graphite is maintained in the expanded state, which results in the lowering of the adhesion between a collector and the powdery graphite in the cathode to cause a fall-off of powdery graphite from the collector, which in turn deteriorates the collector efficiency of the cathode or the charging/discharging property of the battery.

Other than the cathode formed solely of graphite, Japanese Unexamined Patent Publication (Kokai) No. 62-122066 discloses a anode formed of a carbonaceous material obtained by the carbonization of organic substance. Such an electrode, however, is defective in that it has a small lithium-occlusion capacity which is far lower than the theoretical value, if it is formed of prior art carbonaceous material.

SUMMARY OF THE INVENTION

An object of the present invention is to solve the above-described problems in the prior art and provide a cathode for a lithium ion secondary battery formed of a graphite/carbon composite having a large lithium-occlusion capacity and a stable charging/discharging characteristic, a method for producing the same and a lithium ion secondary battery provided with such an electrode, having a large charging/discharging capacity and excellent cycling life properties.

Inventors of the present invention have studied cathodes formed of various carbonaceous materials to achieve the above object, and found that a lithium ion secondary battery having an excellent battery performance is obtainable by using a following carbonaceous composites, for a cathode thereof, which have previously been proposed by the inventors as materials for a voltammetry electrode or a sensor electrode, such as GRC (graphite reinforced carbon) disclosed in Japanese Unexamined Patent Publication (Kokai) Nos. 1-250854 and 3-188367 and used for a spare lead for a mechanical pencil manufactured by Mitsubishi Pencil Co., Ltd. or PFC (plastic formed carbon) disclosed in Japanese Examined Patent Publication (Kokoku) Nos. 63-5348 and 2-34902 and used for an electrolytic solution impermeable electrode.

Crystal edge faces of graphite are rich in activity for electrode reaction, and from a voltamograph obtained by cyclic voltammetry in a sulfuric acid solution, current peaks have been observed in high crystallinity graphite both in the directions of oxidation and reduction, originated from the intercalation. However, in amorphous or random layered-structure carbon used as a binder carbon, the current gradually increased without any characteristic peaks. From these facts, the occlusion of lithium in graphite crystal is largely different from that in binder carbon, and it is surmised that the occlusion in graphite mainly relies on the intercalation and that in binder carbon on the doping (permeation).

To further develop the advantages of high crystallinity graphite and binder carbon of an amorphous or random layered structure and remedy the drawbacks of the both, a graphite-containing carbonaceous composite, which is suitable for a cathode of a lithium ion secondary battery and excellent in activity for electrode reaction as well as mechanical strength by the modification of a composite ratio of graphite in the graphite/carbon composite and the one-directional orientation of crystal edge faces of graphite, has been obtained.

According to the present invention, a cathode for a lithium ion secondary battery is provided which is formed of a graphite/carbon carbonaceous composite containing a high crystallinity powdery graphite bound with a low crystallinity carbon.

The carbonaceous composite material preferably contains the low crystallinity carbon in a range between 25 and 400 parts by weight 100 parts by weight of the high crystallinity graphite.

Preferably the high crystallinity graphite is selected from a group of natural graphite, kish graphite, pyrolytic graphite, gas-growth graphite and artificial graphite, and has an average lattice constant d=(002) of 0.338 nm or less obtained by a wide-angle X ray diffraction and a crystallinite size L=(002) in the direction of C axis of 40 nm or more.

The low crystallinity carbon preferably has an average lattice constant d=(002) of 0.350 nm or more obtained by a wide-angle X ray diffraction and a crystallite size L=(002) in the direction of C axis of 25 nm or less.

According to the present invention, a method for the production of a cathode for a lithium ion secondary battery is provided which comprises the steps of: mixing a high crystallinity powdery graphite with an organic binder while applying a high shearing force so that a composition is obtained wherein both the components are dispersed in each other under a mechano-chemical reaction, extrusion-molding the thus obtained composition so that the high crystallinity graphite is highly oriented, and heat-treating the extrusion molded composition in an inert atmosphere or a non-oxidation atmosphere so that the organic binder contained therein is carbonized into an amorphous or random layered structure to obtain a "graphite/carbon" composite, from which composite is produced the cathode.

The organic binder is organic substances capable of remaining carbides of an amorphous or random layered structure after being heat-treated in an inert or non-oxidation atmosphere, and is preferably selected from a group of natural and synthetic polymers, monomers, oligomers, tars, pitches, carbonized pitches, thermoplastic resins and pre-polymers of thermosetting resins.

The heat-treatment and the carbonization are favorably carried out in an inert or non-oxidation atmosphere at a temperature in a range between 500 and 1,100° C.

The obtained carbonaceous composite for a cathode is ground to a powder of an average particle size in a range between 5 and 50 μm, which is then mixed with a solvent of a resin insoluble in an electrolytic solution. The mixture thus obtained is coated on a metallic foil and the solvent is vaporized to keep the carbonaceous composite firmly bonded onto the metallic foil which in turn is shaped to a required configuration suitable for the electrode.

According to the present invention, a lithium ion battery is also provided, comprising a cathode formed of a graphite/carbon composite wherein a high crystallinity graphite is bound with a low crystallinity carbon, an anode and an electrolytic solution with lithium ions dissolved therein.

BRIEF DESCRIPTION OF THE DRAWINGS

The present invention will be described in more detail with reference to the preferred embodiments illustrated in the attached drawings; wherein

FIG. 2 is a characteristic curve of the charging/discharging property of Example 1 of the present invention; and FIG. 3 is a characteristic curve of the charging/discharging property of Example 2 of the present invention.

DESCRIPTION OF THE PREFERRED EMBODIMENTS

Figure 1:
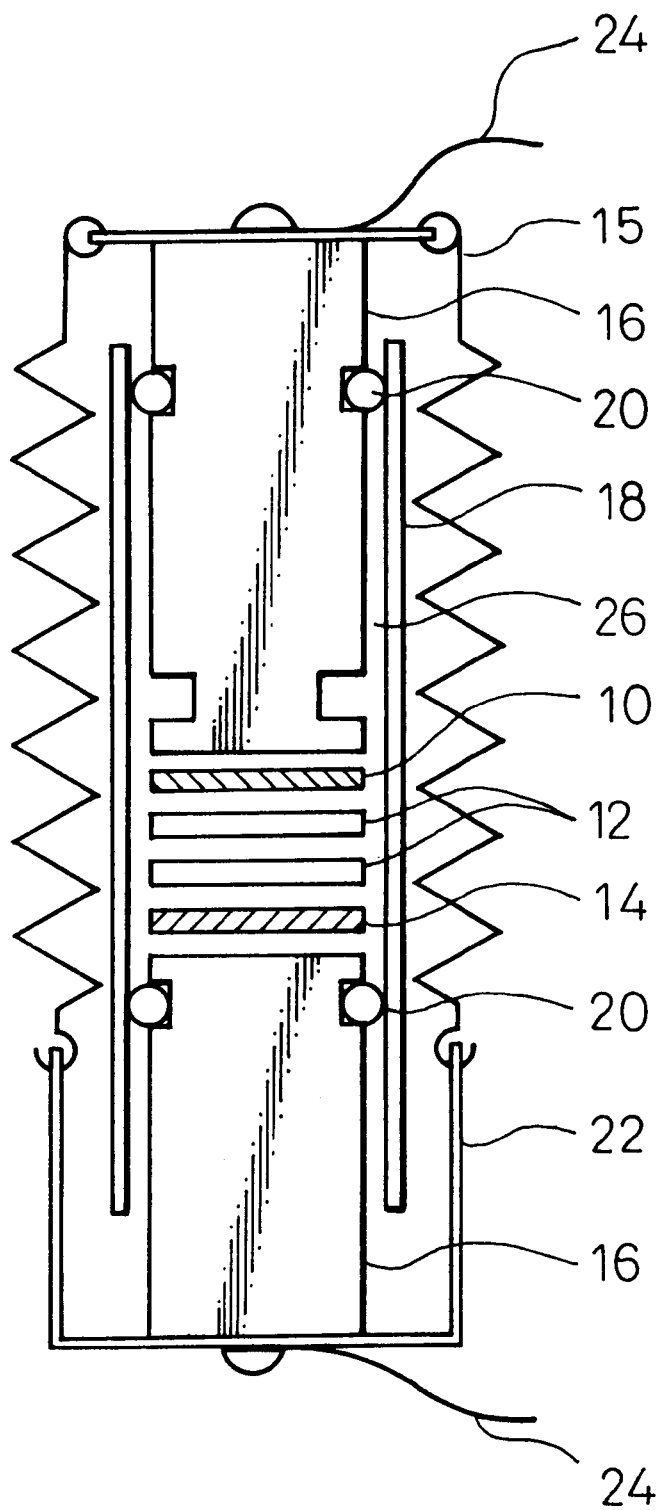
FIG. 1 is a schematic view of a test cell for the charge/discharge test.

Explanation will be made of a starting material for the binder carbon. Examples of natural and synthetic organic polymers other than thermoplastic and thermosetting resins described later are compounds having condensated polycyclic aromatic groups in a basic structure thereof, such as lignin, cellulose, tragacanth gum, arabic gum, natural rubber and derivatives thereof, saccharide, chitin or chitosan; and Indanthrene type vat dyes and intermediates thereof, derived from formalin condensates of naphthalenesulfonic acid, pyrene, pyranthrone, benzoanthrone or others.

Examples of thermoplastic resins are ordinary type thermoplastic resins such as polyvinyl chloride, polyacrylonitrile, polyvinylidene chloride, postchlorinated polyvinyl chloride, polyvinyl acetate, polyvinyl alcohol, polyvinyl pyrrolidone, ethyl cellulose, carboxymethyl cellulose or polyvinyl chloride/vinyl acetate copolymer; and heat-resistant thermoplastic resins such as polyphenylene oxide, polyparaxylene, polysulfone, polyimide, polyamide imide, polybenzimidazole or polyoxadiazole; which are all oxidation-crosslinked through a carbon precursor treatment.

Examples of thermosetting resins are phenolic resin, furan resin, epoxy resin, copna resin or others which are fluidized by heat and then solidified to have a three-dimensional structure, via an inter-molecular crosslinking, whereby a high yield for residual carbon is obtained without any special carbon-precursor treatments.

Examples of pitches are petroleum pitch, coal tar pitch, asphalt, and dry distillation pitch of these pitches and hydrocarbon compounds such as synthetic resins (treated at a temperature lower than 400° C. to have a yield for residual carbon in a range between 75 and 95%), to which is applied an anti-graphitization treatment such as an oxidation treatment.

Next, an explanation will be made of the powdery graphite mixed with the organic substance used for the starting material for the binder carbon. It is important for the purpose of enhancing the battery reaction to produce a carbon composite in which highly developed crystal edge faces of graphite are oriented perpendicularly to a reaction surface of electrode. Accordingly, the following are favorably used: graphite whiskers, highly oriented vapor-pyrolytic graphite (HOPG), vapor-growth carbon fiber (VGCF), kish graphite and crystalline natural graphite. A favorable particle size is less than several μm, which may vary in accordance with the aimed battery structures.

Explanation will be made on the production of the carbonaceous material for a cathode according to the present invention. One kind or more of the above-described natural and synthetic polymers, thermosetting resins, thermoplastic resins or pitches are selected as a starting material for the organic substance capable of remaining amorphous carbon composing the binder carbon. The powdery crystal graphite is blended thereto in accordance with the purpose and sufficiently dispersed by a Henshel mixer or the like.

If a high density and/or a large capacity are needed, the dry-distillation pitch having a high yield for residual carbon may be blended to the above composition together with a plasticizer or a solvent and sufficiently mixed and distributed under the mechano-chemical reaction through a kneader capable of exerting a high shearing force such as a pressurized type or a dual roller type. Then the mixture is granulated through a pelletizer, and extruded at a high speed through an extruder such as a screw type or a plunger type to be a green extrudate having a required diameter wherein graphite crystals are orderly oriented in the extruded direction.

Then, the green extrudate is heat-treated in an airborne oven heated at 180° C. for 10 hours to be a carbon precursor. Further, the precursor is gradually heated in a nitrogen gas to a predetermined temperature lower than 1,100° C. under a controlled heating rate. Thus an objective carbonaceous material for a cathode is obtained.

The final firing temperature is usually in a range between 500 and 1,100° C., preferably between 700 and 900° C.

The carbonaceous material thus obtained is impact-ground to be an average particle size in a range between 5 and 50 $\mu$m, and a solution of polyvinyl fluoride (PVF) dissolved in N-methylpyrolidone is mixed therewith on a metallic foil of a collector. The mixture is heated together with the metallic foil in the air to evaporate the solvent. Carbon powder is bonded to the metallic foil by PVF acting as a binder. The metallic foil carrying the carbon powder is subjected to a blanking operation to be a cathode of a disk shape. The cathode thus obtained is heated in vacuum to be absolutely dried.

A structure of a test cell for a lithium ion battery is illustrated in FIG. 1. A mating electrode 10 is formed of metallic lithium of excessive amount, and a separator 12 is formed of three-layers of filter paper. The mating electrode 10 and a working electrode 14 are pressed to each other by stainless steel rods 16 biased with a spring 15. The stainless steel rods 16 are accommodated in a glass tube 18 and tightly sealed by O rings 20. Reference numerals 22 and 24 denote a celluloid film and electric wires, respectively. An electrolytic solution is formed of ethylene carbonate (EC), diethyl carbonate (DEC) and lithium perchlorate mixed with each other at a ratio of 52.8:38.8:8.4 by weight.

According to the present invention, it is possible to easily produce a carbonaceous material for a high performance cathode, by which a lithium ion secondary battery can be obtained, having a high charge/discharge capacity and excellent in a cycling stability.

EXAMPLE 1

As a raw material for a binder carbon of a cathode, 50 parts by weight of a compound of chlorinated vinyl chloride resin (produced by Nippon Carbide Industries Co., Ltd.; T-742) and 50 parts by weight of powdery natural graphite (Nippon Graphite Co., Ltd.; CSSP-B, average particle size of 1 $\mu$m) were added to 20 parts by weight of diallyl phthalate monomer used as a plasticizer. The respective components were distributed in the mixture through a Henshel mixer, and then subjected to the repeated kneading operations through a dual roller type mixer heated at a surface temperature of 120° C. to be sheet-like paste which was then converted to pellets through a pelletizer. The pellets were fed to a screw type extruder and extruded therethrough at a temperature of 130° C. and a speed of 3 m/sec under deaeration while using a die of 0.7 mm diameter. The extrudate was then drawn and treated in an airborne oven for 10 hours to be a linear member of a carbon precursor. The precursor was heated in a nitrogen gas at a heating rate of 10° C./hour until it reached 500° C. and 50° C./hour in a temperature range between 500° C. and 1,000° C., and left to cool naturally after being maintained at 1,000° C. for 3 hours. Thus the firing operation was completed.

The carbonaceous cathode material thus obtained had a "graphite/carbon" ratio of 80/20 by weight, a diameter of 0.5 mm and an opening porosity of 20%. Next, the carbonaceous cathode material was impact-ground to have an average particle size of the order to 50 $\mu$m, which was then mixed on a copper foil (10 $\mu$m thick) with a 5% by weight solution containing polyvinylidene fluoride (PVDF) in N-methylpyrolidone so that a ratio is maintained wherein 1 mg of the carbonaceous cathode material is mixed in 0.001 cc of the solution. The mixture was heated in the air at 110° C. together with the copper foil to evaporate the solvent. The carbon powder was bonded to the copper foil via the PVDF used as a binder, which foil carrying the carbon powder was then subjected to a blanking operation to produce a disk-shaped cathode of 5.3 mm diameter. The cathode had a net weight of 1 to 2 mg without the copper foil, and was dried for one day at 110° C. in vacuum so that an absolute dry state resulted. The charge/discharge test was carried out on the obtained cathode using the test cell shown in FIG. 1. A mating electrode was formed of metallic lithium of an excessive amount and separators were formed of three-layers of filter paper. Both the electrodes were pressed to each other while using stainless steel rods of 8 mm diameter. The stainless steel rods were inserted into a glass tube of 10 mm outer diameter and 8 mm inner diameter, and tightly sealed by O rings. An electrolytic solution was prepared of ethylene carbonate (EC), diethyl carbonate (DEC) and lithium perchlorate (LiClO$_4$) mixed with each other at a ratio of 52.8:38.8:8.4 by weight.

The charge/discharge test was as follows: On a first time, the charge (in this regard, "charge" means that the current flows in the direction to allow lithium ion to enter the carbonaceous electrode) was conducted at a constant current having a current density of 0.1 mA/cm$^2$ until the voltage reached 0V from 3V which is a potential difference of lithium, while the discharge was conducted at the same current density until the voltage reached 1V. On a second time or after, the charge/discharge were conducted between 0V and 1V at the same current density. The charge/discharge characteristic curve is illustrated in FIG. 2.

EXAMPLE 2

As a raw material for a binder carbon of a cathode, a composition of 40 parts by weight of vinyl chloride resin (produced by Nippon Zeon Co., Ltd.; polymerization degree of 2000) and 60 parts by weight of powdery kish graphite (produced by Kowa Seiko Co., Ltd.; average particle size of 5 $\mu$m) were mixed together and processed in a similar manner as Example 1. The carbonaceous cathode material thus obtained had a "graphite/carbon" ratio of 86/14 by weight, a diameter of 0.6 mm and an opening porosity of 30%. A test cell was prepared by using this carbonaceous cathode material in a similar manner as Example 1. The charge/discharge characteristic curve is illustrated in FIG. 3.

What is claimed is:

1. An electrode of a lithium ion secondary battery, the electrode functioning as a positive electrode when used with a metallic lithium electrode, said electrode comprising a graphite/carbon carbonaceous composite containing a powdery graphite having first crystallinity bound with a carbon having second crystallinity lower than the first crystallinity, and wherein said electrode occludes lithium ions.

2. An electrode of a lithium ion battery as defined by claim 1, wherein the carbonaceous composite contains the carbon in a range between 25 and 400 parts by weight and the graphite at 100 parts by weight.

3. An electrode of a lithium ion battery as defined by claim 1, wherein the graphite is selected from the group consisting of natural graphite, kish graphite, pyrolytic graphite, gas-growth graphite and artificial graphite, and has an average lattice constant d=(002) of 0.338 nm or less obtained by a wide-angle X ray diffraction and a crystallite size L=(002) in the direction of C axis of 40 nm or more.

4. An electrode of a lithium ion battery as defined by claim 1, wherein the carbon has an average lattice constant d=(002) of 0.350 nm or more obtained by a wide-angle X ray diffraction and a crystallite size L=(002) in the direction of C axis of 25 nm or less.

5. An electrode of a lithium ion battery as defined by claim 2, wherein the graphite is selected from the group consisting of natural graphite, kish graphite, pyrolytic graphite, gas-growth graphite and artificial graphite, and has an average lattice constant d=(002) of 0.338 nm or less obtained by a wide-angle X ray diffraction and a crystallite size L=(002) in the direction of C axis of 40 nm or more.

6. An electrode of a lithium ion battery as defined by claim 2, wherein the carbon has an average lattice constant d=(002) of 0.350 nm or more obtained by a wide-angle X ray diffraction and a crystallite size L=(002) in the direction of C axis of 25 nm or less.

7. An electrode of a lithium ion secondary battery as defined by claim 1, wherein the carbonaceous composite is powdery and contains a binder for binding the powdery carbonaceous composite.

8. The electrode of claim 1, wherein said electrode comprises a cathode when another electrode of the lithium ion secondary battery comprises metallic lithium.

9. A lithium ion secondary battery comprising a first electrode including a graphite/carbon carbonaceous composite wherein a graphite having first crystallinity is bound with a carbon having second crystallinity substantially lower than the first crystallinity, a second electrode and an electrolytic solution with lithium ions dissolved therein, wherein said first electrode occludes lithium ions, said first electrode functioning as a positive electrode when the second electrode is a metallic lithium electrode.

10. A lithium ion secondary battery as defined by claim 9, wherein the carbonaceous composite contains the carbon in a range between 25 to 400 parts by weight to 100 parts by weight of the graphite.

11. A lithium ion secondary battery as defined by claim 9, wherein the graphite is selected from the group consisting of natural graphite, kish graphite, pyrolytic graphite, gas-growth graphite and artificial graphite, and has an average lattice constant d=(002) of 0.338 nm or less obtained by a wide-angle X ray diffraction and a crystallite size L=(002) in the direction of C axis of 40 nm or more.

12. A lithium ion secondary battery as defined by claim 9, wherein the carbon has an average lattice constant d=(002) of 0.350 nm or more obtained by a wide-angle X ray diffraction and a crystallite size L=(002) in the direction of C axis of 25 nm or less.

13. A lithium ion secondary battery as defined by claim 10, wherein the graphite is selected from the group consisting of natural graphite, kish graphite, pyrolytic graphite, gas-growth graphite and artificial graphite, and has an average lattice constant d=(002) of 0.338 nm or less obtained by a wide-angle X ray diffraction and a crystallite size L=(002) in the direction of C axis of 40 nm or more.

14. A lithium ion secondary battery as defined by claim 10, wherein the carbon has an average lattice constant d=(002) of 0.350 nm or more obtained by a wide-angle X ray diffraction and a crystallite size L=(002) in the direction of C axis of 25 nm or less.

15. A lithium ion secondary battery as defined by claim 9, wherein the carbonaceous composite is powdery and contains a binder for binding the powdery carbonaceous composite.

16. The lithium ion secondary battery as defined by claim 9, wherein the first electrode comprises a cathode and the second electrode comprises a metallic lithium anode.

* * * * *